(12) United States Patent
Yoon (10) Patent No.: US 8,065,215 B2
(45) Date of Patent: Nov. 22, 2011

(54) REAL ESTATE TRANSACTION SYSTEM USING REAL ESTATE SECURITIES AND METHOD THEREOF

(75) Inventor: Ho Won Yoon, Seoul (KR)

(73) Assignee: Hyun Jin Youn, Gyeongsangnam-Do (KR)

( * ) Notice: Subject to any disclaimer, the term of this patent is extended or adjusted under 35 U.S.C. 154(b) by 527 days.

(21) Appl. No.: 12/103,888

(22) Filed: Apr. 16, 2008

(65) Prior Publication Data

US 2009/0164360 A1    Jun. 25, 2009

(30) Foreign Application Priority Data

Dec. 21, 2007 (KR) .................. 10-2007-0134866
Jan. 18, 2008 (KR) .................. 10-2008-0005552
Feb. 18, 2008 (KR) .................. 10-2008-0014557

(51) Int. Cl.
*G06Q 40/00* (2006.01)

(52) U.S. Cl. ............. 705/36 R; 705/39; 705/35; 705/42

(58) Field of Classification Search .................. 705/35, 705/42, 10, 39
See application file for complete search history.

(56) References Cited

U.S. PATENT DOCUMENTS

| | | | |
|---|---|---|---|
| 2002/0046144 A1* | 4/2002 | Graff | 705/36 |
| 2002/0082903 A1* | 6/2002 | Yasuzawa | 705/10 |
| 2006/0095355 A1* | 5/2006 | Mayers et al. | 705/35 |

* cited by examiner

*Primary Examiner* — Behrang Badii
(74) *Attorney, Agent, or Firm* — Rabin & Berdo, P.C.

(57) ABSTRACT

Provided are a real estate transaction system and method using real estate trust that are capable of lessening a burden on a residence right holder and investors by securitizing real estate and selling a plurality of divided securities including a security for ownership and a security for investment. A real estate special purpose company buys real estate and divides a right for real estate into a residence right and an investment right that is transacted as an investment security at a real estate security exchange, like normal security, with the residence right and the investment right having different dividend percentages, such that a buyer desiring actual residence resides on the property by paying only a portion of the price of the real estate and a person desiring investment invests in real estate for desired equity.

12 Claims, 9 Drawing Sheets

| Real estate Securitization Request ||
|---|---|
| Real Estate ||
| Address | 115, Bangbae-dong, Seocho-gu, Seoul, Korea |
| Building name | Seohyeon Apartment |
| Type | Apartment |
| Manager ||
| Identification number | 420912-******* |
| Name | Young-Ju, Bang |
| Address | 101, Seohyeon Apartment # 7, 115, Bangbae-dong, Seocho-gu, Seoul, Korea |
| Residence Right | 41% |
| Investment Security Equity Ratio | 59% |
| Total stocks of Investment Security | 1000 stocks |
| Price of Issued Investment Security | XXXXX Won |

FIG. 9

| Real estate Right Book ||
|---|---|
| Real Estate ||
| Address | 115, Bangbae-dong, Seocho-gu, Seoul, Korea |
| Building name | Seohyeon Apartment |
| Type | Apartment |
| Rightful person ||
| Residence Right | 41% |
| Investment Security Equity Ratio | 59% |
| Total stocks of Investment Security | 1000 stocks |
| Price of Issued Investment Security | XXXXX Won |
| Residence-right holder ||
| Name | Young-Ju, Bang |
| Identification number | 420912-******* |
| Address | 101, Seohyeon Apartment # 7, 115, Bangbae-dong, Seocho-gu, Seoul, Korea |
| Residence Right | 41% |
| Investor ||
| Name | Young-Sik, Kim |
| Identification number | 601212-******* |
| Address | ***, * Apartment # *, ***-*, **-dong, Seocho-gu, Seoul, Korea |
| Residence Right | 34% |
| Name | Gi-Hwan, Back |
| Identification number | 730211-******* |
| Address | ***, * Apartment # *, -, **-dong, Mapo-gu, Seoul, Korea |
| Residence Right | 25% |

REAL ESTATE TRANSACTION SYSTEM USING REAL ESTATE SECURITIES AND METHOD THEREOF

CROSS-REFERENCE TO RELATED APPLICATION

This application claims the benefit of Korean Patent Application No. 2007-0134866, filed on Dec. 21, 2007, 2008-0005552, filed on Jan. 18, 2008 and 2008-0014557, filed on Feb. 18, 2008 which is hereby incorporated by reference as if fully set forth herein.

BACKGROUND OF THE INVENTION

1. Field of the Invention

The present invention relates to a real estate transaction system and method, and more particularly, to a real estate transaction system and method using real estate securitization that are capable of lessening a burden on a residence right holder and investors by securitizing real estate and selling a plurality of divided securities including a security for ownership and a security for investment.

2. Discussion of Related Art

In general, since real estate is expensive and exhibits high individuality and locality, investors or managers must have a great amount of money or specialized knowledge or experience to invest the money in and manage the real estate. In addition, a transaction scale of the real estate is relatively large with a low market liquidity and a low fluidity.

Upon stagnation of real estate, the number of real estates for sale for overcoming an enterprise's financial difficulty and reconstructing an enterprise's organization and real estates for sale caused by unemployment rapidly increases and the real estates are hardly sold. This obstructs the reconstruction of the enterprise's organization and increases bad loans of banking agencies, and in turn leads to sudden fall in a price of the real estate due to severe transaction reduction. Upon growth of real estate, investors having a small amount of moneys cannot easily take part in transactions of real estate because of features of the real estate of a large transaction scale and a low liquidity, which may cause real estate market to be disturbed by venture capitals.

To overcome such disadvantages of the real estate, goods integrating the real estate market with a financial market, such as real estate fund and real estate investment trusts (REITs) have appeared. However, they do not spread because of existence of alternative investment goods with a high liquidity and high profitability.

The real estate fund is a collection of capitals for real estate investment, and a specialist invests the collected capitals in a variety of carefully selected real estate, such as real estate development, profitable real estate, project financing, and Asset Backed Securities (ABS), and distributes earnings. Revenue resulting from investment of a small amount of money in real estate is returned to investor.

The REITs have the same nature as the real estate fund in that they act as an investment means in an indirect investment market for real estate, but differ in a legal nature and structure from the real estate fund. The REITs are a stock company directed to investment in real estate, and must have internal asset management functionality and hold a certain capital. Also, the REITs are required to hold the real estate corresponding to above 70% of the asset and face difficulties in investing the capital in real estate developments and loaning the capital because they are in the form of a stock company. The REITs are goods resulting from standardization and securitization of investment equity as small units. That is, the real estate equity is divided into small units, securitized, and connected to a plurality of investors via a capital market. In particular, the REITs provide an opportunity for investing in real estate to investors having a small amount of money.

However, the investment fund and the REITs are both focused on investment so that investors having a small amount of money take part in real estate investment. These advantageously induce many investors and capitals to the real estate investment to a real estate market and prevent the real estate market from being disturbed by the venture capitals. However, the investment fund and the REITs do not consider the fact that essential purpose of the real estate is not investment but actual residence and use of lands.

Accordingly, people desiring to hold stable residence spaces neglect existing real estate investment not suitable for actual residence and do not take part in the real estate market. In addition the investors avert their eyes from conventional investment scheme because it has difficulty in making a target investment in a picked real estate.

Developments in communication technology have led to a system that provides real estate transaction information and brokers real estate transactions via a network such as the Internet. However, there is no system for real estate transaction for actual residents. For example, a technique of mitigating risk in real estate transactions through a network is disclosed in Korean Patent Application No. 10-2003-0033334, entitled "System and Method for Mediating Transactions in Real Estate Though Network" and Korean Patent Application No. 10-2004-0017945, entitled "Method For Real Estate Transaction with Escrow and Title Insurance through Computer Network". However, these schemes are directed to existing direct investment, in which it is necessary to acquire an ownership for real estate for real estate investment.

As a result, direct investment directed to ownership acquisition lays a burden on investors in investment money, progressive tax, and transaction-related tax aspects. Existing real estate financial goods directed to only equity do not provide target investment and fail to attract investors. People desiring to use the property take part in a real estate market only in a consumptive way such as lease. Meanwhile, even though developments in communication technology have led to infrastructure enabling easy access to real estate-related information, users utilize only information on a trend of the real estate to check existence of vacancy houses or information on real estate for sale.

Accordingly, there is a need for a new real estate transaction system and method capable of satisfying both investors and an actual resident by utilizing an existing communication infrastructure

SUMMARY OF THE INVENTION

To solve the aforementioned problems associated with conventional real estate transactions and provide a variety of additional advantages, the present invention is directed to a real estate transaction system and method using real estate securitization in which a real estate special purpose company buys real estate and divides a right for real estate into a residence right and an investment right that is transacted as an investment security at a real estate security exchange, like normal security, with the residence right and the investment right having different dividend percentages, such that a buyer desiring actual residence resides on the property by paying only a portion of the price of the real estate and a person desiring investment invests in real estate for desired equity.

The present invention is also directed to a real estate transaction system and method using real estate securitization in which a server providing real estate securitization service divides a right for real estate for sale into a residence right and an investment right each having a different dividend percentage, sells the residence right and the investment right via a security transaction server, pays transaction money according to a contract, and establishes the rights to lessen a burden of retrieving investment money and guarantee safe transfer of the right.

The present invention is also directed to a real estate transaction system and method using real estate securitization in which a portion of an ownership of real estate is divided into a plurality of equities and securitized into investment security to be circulated like normal securities, and buyers are allowed to circulate their equity right at an exchange, so that freely dividable equity rights for the real estate are circulated a plurality of times.

The present invention is also directed to a real estate transaction system and method using real estate securitization which enables easy and safe sale of an equity right of real estate by carrying out the equity right sale through transactions or post-contract transactions at a seller-set price based on an evaluated price from current price of the real estate or through competition, automatically paying a cost, and automatically changing a real estate right of the real estate special purpose company.

A first aspect of the present invention provides a real estate transaction system for securitized real estate equity sale using trader terminals connected via a communication network, the system including: a real estate securitization server for buying real estate, dividing an equity right for the real estate into a residence right and an investment security each having a different dividend right, and managing a right and dividend for the security; a real estate security transaction server for providing information on the investment security from the real estate securitization server and information on investment security sale from the trader terminal, together with information on an evaluated price of the real estate, dividing and buying the investment security in response to a buy request from the trader terminal, and providing the resulting change in the right to the real estate securitization server; and an asset evaluation server for providing the information on an evaluated price for the real estate corresponding to the investment security to the real estate security transaction server.

The real estate securitization server may include a right establisher for dividing the equity right for the real estate into the residence right and the investment security, and the right establisher may determine at least one of an equity right ratio between the residence right and the investment security, a dividend ratio between the residence right and the investment security, a buying condition for a residence right holder, a condition of a selling time, and a condition of a dividend date, based on a predetermined criterion.

A second aspect of the present invention provides a real estate transaction method between real estate and equity trader terminals connected to a communication network, the method including: a real estate securitization step of dividing, by a real estate securitization server, an equity right for real estate for sale into a residence right and an investment security each having a different dividend ratio, based on information on the real estate provided by a seller terminal and asset evaluation information for the real estate; a security circulation step of receiving, by a real estate security transaction server, investment security information from the real estate securitization server or selling information for the investment security from trader terminal, providing the investment security information together with the asset evaluation information to the trader terminal, and providing right change information resulting from the sale to the real estate securitization server; a right updating step of updating, by the real estate securitization server, right information for the real estate equity right with the right change information received from the real estate securitization server; and a dividend providing step of providing, by the real estate securitization server, dividends for the residence right and the investment security at predetermined different dividend percentages when a predetermined dividend condition is satisfied.

The method may further include a residence-right circulation step of providing, by the real estate security transaction server, residence right information from the real estate securitization server or residence right information from the trader terminal together with the asset evaluation information to the trader terminal, carrying out transaction in response to a buy request from a buyer satisfying a predetermined buying condition, and providing right change information to the real estate securitization server.

The method may further include a step of providing, by the real estate security transaction server, the residence right and investment security information from the real estate securitization server to the trader terminal, making a sale contract, and providing the contract information to the real estate securitization server; and a registered-right establishing step of, when the received sale contract satisfies a predetermined criterion, buying, by the real estate securitization server, the real estate from a seller according to the contract, acquiring an ownership of the real estate, and establishing rights for the divided residence right and investment security.

The method may further include a residence-right entrusting and selling step of providing, by either the real estate security transaction server or the real estate securitization server, information on a residence right for sale to a foreign management company for providing offline real estate brokering and, when information on a sold residence right is received from the foreign management company, updating, by the real estate securitization server, the right with the information.

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which.

DETAILED DESCRIPTION OF EXEMPLARY EMBODIMENTS

Hereinafter, exemplary embodiments of the present invention will be described in detail with reference to the accompanying drawings. The present invention is not limited to the embodiments disclosed below, but can be implemented in various forms. The following embodiments are described to enable those of ordinary skill in the art to embody and practice the invention.

Figure 1:
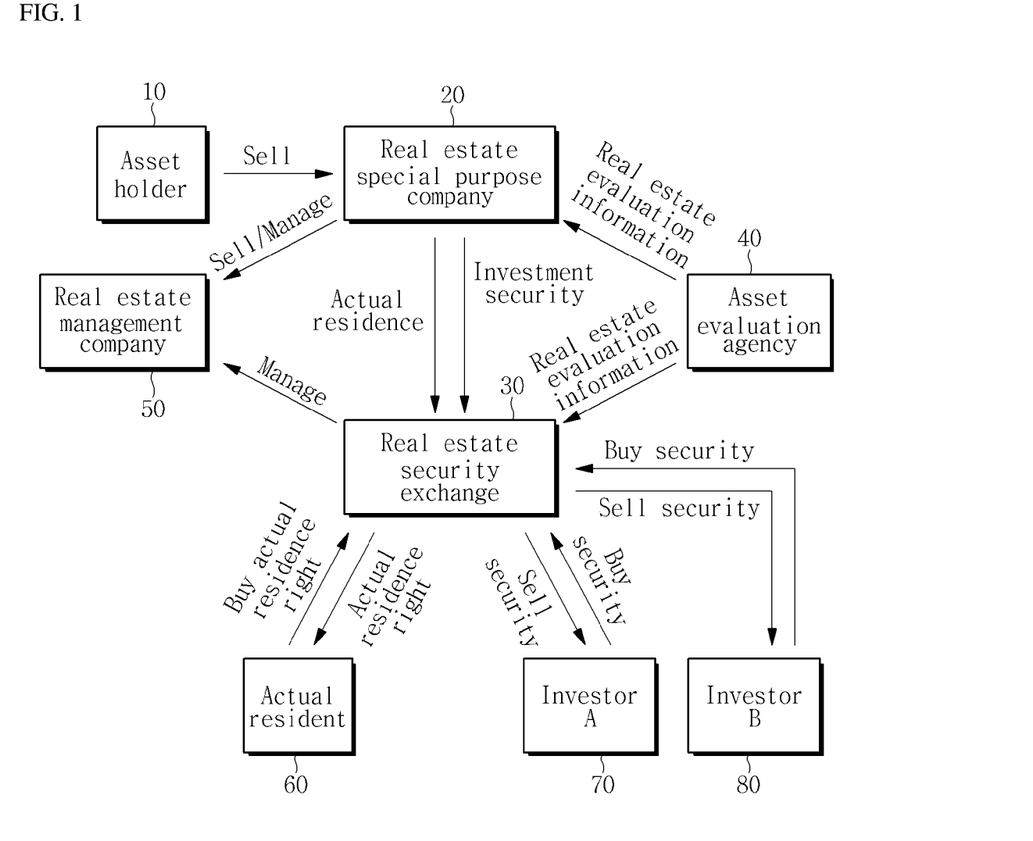
FIG. 1 is a block diagram illustrating a concept of the present invention.

FIG. 1 illustrates a concept of real estate securitization. While exemplary embodiments of the present invention will be described with respect to real estate, the system and method of the present invention may apply to quasi-real estate that can be entrusted, occupied, or invested by a person, such as vehicles, ships, works of art, curios, etc.

Referring to FIG. 1, an asset holder 10 sells his or her real estate to a real estate special purpose company 20. In this case, the asset holder 10 may sell an entire ownership of the real estate, a residence right corresponding to some of equities of the ownership, or a remaining equity except for the residence right.

The estate special purpose company 20 or a separate real estate trust company is written as an owner of the sold real estate on a real estate register. A record on residence right and investment security holders may be found from a trust book of the real estate special purpose company 20 or the trust company.

That is, the real estate is registered in the name of the real estate special purpose company 20 or the trust company rather than in the name of both an actual resident and investors who hold the equity right in order to avoid preservation disposal or forcible execution. This prevents a trouble of an ownership, thus reliably protecting the equity right.

The real estate special purpose company 20 divides the entire ownership of the real estate into a residence right and an investment right. The residence right yields a right to use the real estate and receive a gain, and the investment right is further divided into investment security with a price per stock, listed in a real estate security exchange 30, and sold to investors. The residence right may be sold at the real estate security exchange 30.

A residence right holder owning land, a warehouse, or a building other than an apartment entrusts such real estate to a separate real estate management company 50 because he or she, as an individual, cannot easily manage such real estate. In this case, the residence right holder can obtain lease revenue excluding a commission to be provided to the real estate management company. Meanwhile, the real estate special purpose company 20 may own a residence right of such real estate from which lease revenue or use revenue is expected. The real estate management company 50 may be a real estate franchise that performs offline real estate brokering or an association of real estate brokers. This allows for brokering residence right sale when a buyer needs to visit a real estate broker in order to make a sell request for real estate (through dividend or agreement with an equity right holder) or to buy a residence right.

The real estate special purpose company 20 issues the investment security by dividing a remaining equity except for the residence right equity in consideration of price, preference, and the like of the real estate. For example, when 51% is assigned to the residence right, which necessitates the equity of 51%, the real estate special purpose company 20 issues the security corresponding to the equity of 49% (e.g., 10000 stocks) to be sold at the real estate security exchange 30, with each stock having its face value.

In this case, the price of the real estate may be evaluated by the asset evaluation agency 40 to reflect the evaluated price of the real estate. Meanwhile, the asset evaluation agency 40 may provide the evaluated price of the real estate in cooperation with the real estate security exchange 30 when security transaction is made, and update the evaluation information with the selling price of the sold security.

Meanwhile, the real estate special purpose company 20, when dividing the residence right and the investment security, sets the equity of the residence right to 51% of the entire equity of the real estate. The equity of the residence right may be changed. Equity percentages may differ among nearby real estates having similar value.

The investment security is transacted with its price determined by a principle of supply and demand at the real estate security exchange 30. In such transaction, the investor is allowed to directly invest in desired real estate, unlike existing indirect investment for real estate. A price of the investment security for the specific real estate is changed in real time by investors who are susceptible to current value and future value of the real estate. The price of the investment security depends on a state and location of individual real estate, resulting in a fine, accurate, and real-time price of the real estate. Accordingly, it is difficult to determine the price of individual investment security, based on existing simple real estate price information, which only suggests a simple reference. In the exemplary embodiment, the value of the real estate investment security including the dividend right is calculated exactly, and when the security is actually sold, the value information is fed back to the asset evaluation agency 40, for more accurate evaluation for individual real estate.

When the real estate must be sold for cash (through agreement among all investment security holders and a residence right holder or satisfaction of other legal conditions), transaction money for the real estate may be provided as a dividend in proportion to equity percentages. In this case, since the residence right holder directly uses the real estate or obtains lease revenue, the investment security holder preferably has a greater dividend ratio than the residence right holder. The division ratio and the dividend ratio between the residence right and the investment security may be determined when the real estate special purpose company 20 divides the equity right into the residence right and the investment security.

Meanwhile, the real estate special purpose company 20, when dividing the equity right, may set some of a division ratio, a dividend ratio, a condition of a residence right buyer (which may be preset individually or according to a national policy), a condition of a selling time (a residence right holder may be prohibited to resell a residence right for a predetermined period of time after buying the residence right), a dividend date, and a dividend condition. Meanwhile, the asset holder 10, when making a sell request, may request to set some of a selling value and the above selectable conditions (e.g., the division ratio and the dividend ratio).

Figure 2:
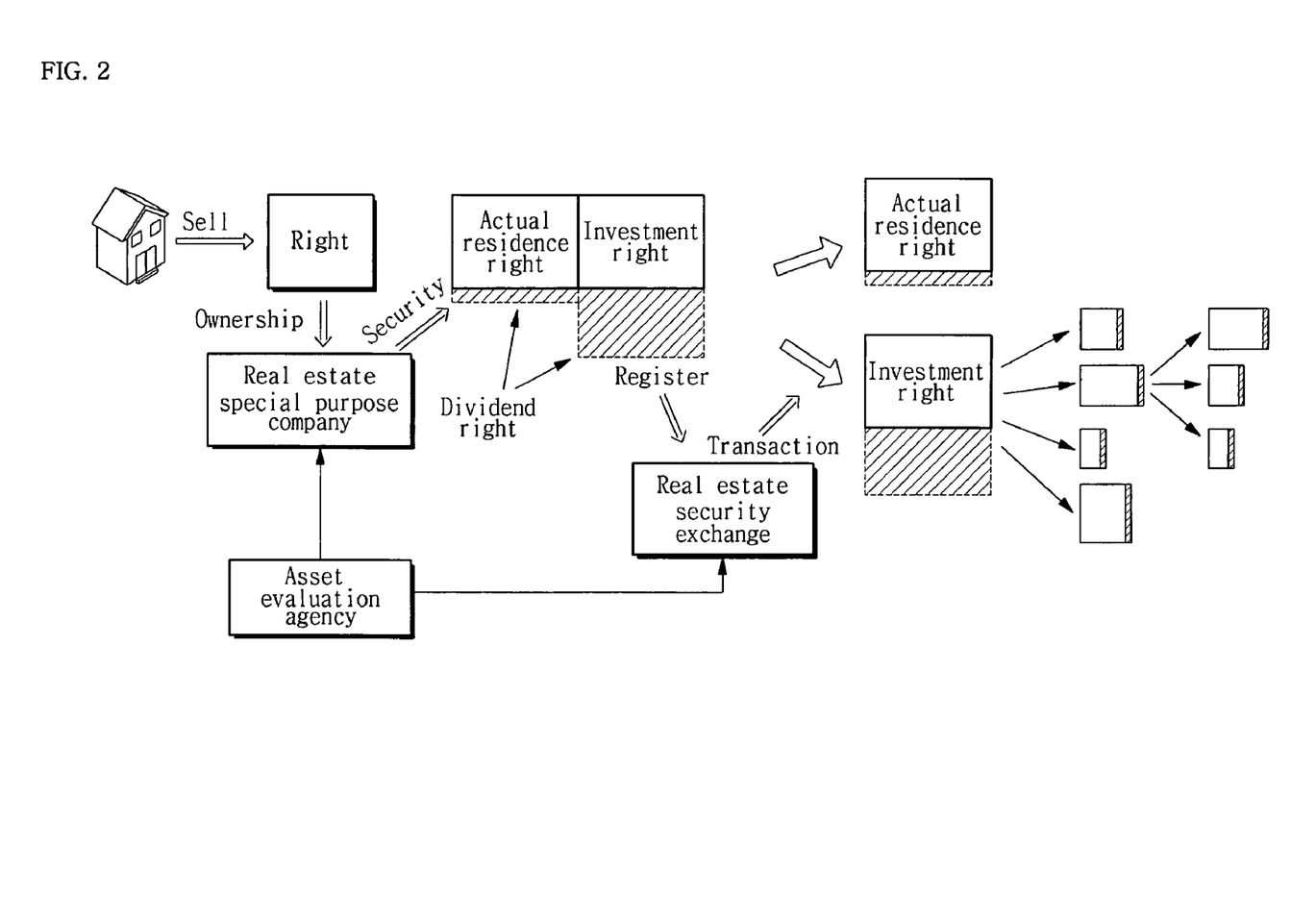
FIG. 2 is a conceptual diagram illustrating division of an equity right according to the present invention.

FIG. 2 is a conceptual diagram illustrating a difference between the scheme according to an exemplary embodiment of the present invention and a typical indirect investment scheme for real estate or a typical transaction scheme for a lease right yielding a residence right. As shown in FIG. 2, to sell the real estate, the real estate special purpose company or the trust company becomes an ownership of the real estate and divides the equity right into the residence right and the investment right in preparation for transaction as security, based on information from the asset evaluation agency.

This security transaction preparation process yields the residence right as a first transaction object and the separate investment right as a second transaction object, unlike the typical indirect investment for real estate. The residence right holds a direct right for a portion of the real estate right, e.g., a dividend right to receive a dividend from the capital gain of the real estate, unlike the typical lease right. Meanwhile, the investment right is divided into investment securities, listed, circulated in real time, resulting in the dividend and the capital gain, and guaranteeing stable investment because of a small width of the price fall in light of features of the real estate.

Accordingly, the present invention enables both stable residence and investment, thus satisfying the residence right holder, unlike the existing (long-term) lease. Failure of a national policy for houseless persons, such as half-price apartments or long-term apartment lease, is due to the apartments built in unpopular regions and having no investment value but generating only separate cost and depreciation after apartment residence. Also, this policy undesirably consumes government funds. The exemplary embodiment of the present invention can solve these problems.

That is, the exemplary embodiment of the present invention may apply to existing houses or apartments, as well as new apartments, without discriminating regions or new and old houses. According to the present invention, since an actual resident and investors purchase the equity right of the real estate, a government does not have to support funds. Also, the present invention can satisfy the resident in investment and stable residence aspects and the investors in aspects of target investment, rapid gain realization, and capital turnover through real-time security sale.

Figure 3:
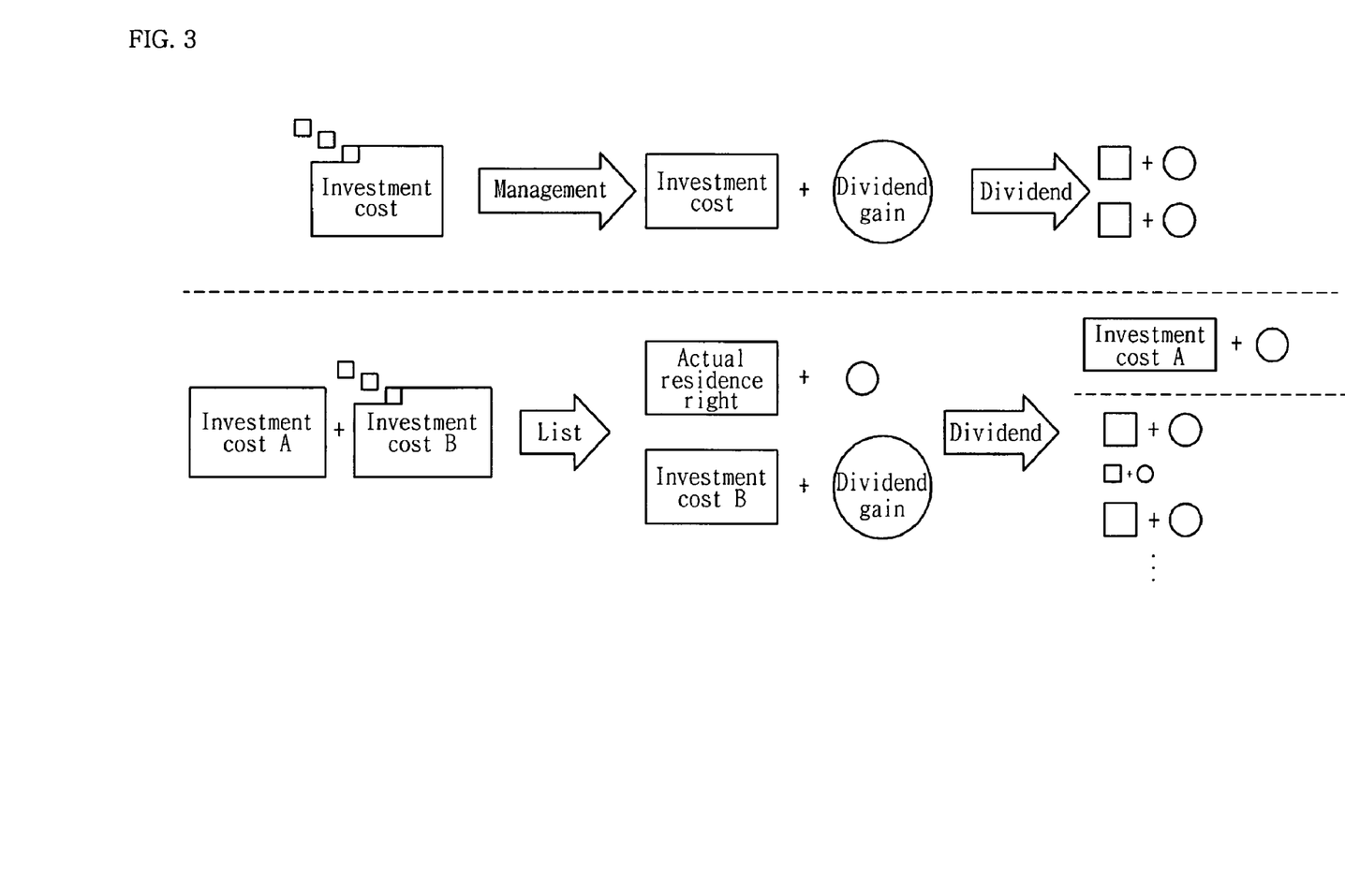
FIG. 3 is a conceptual diagram illustrating division and dividend of an equity right according to the present invention.

FIG. 3 illustrates a detailed difference between the exemplary embodiment of the present invention and a typical indirect investment for real estate. Referring to FIG. 3, the typical indirect investment for real estate refers to collecting investment fund, investing the fund and evenly distributing a dividend gain to investors, as shown in an upper portion of the figure, in which use revenue from real estate is not considered. However, the exemplary embodiment of the present invention includes investing a certain investment money A and collected investment money B in a residence right to obtain real estate use revenue and dividend and an investment right to obtain dividend, and providing the dividend, so that both the capital gain and the real estate use revenue are managed, as shown in a lower portion of the figure. Also, the investment right is securitized and the security is listed. This enables making a large market, retrieving investment money and resulting gain through security transaction at any time.

Figure 4:
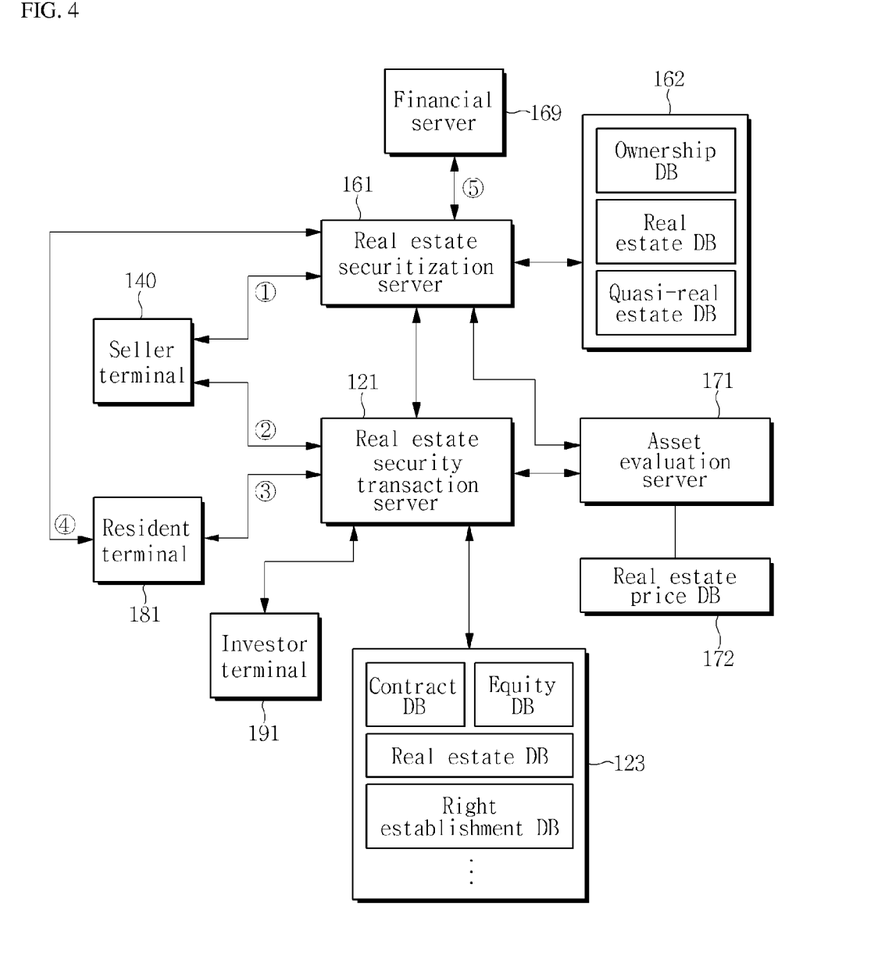
FIG. 4 is a schematic block diagram illustrating a real estate transaction system using real estate trust according to an exemplary embodiment of the present invention.

FIG. 4 is a block diagram illustrating a real estate transaction system according to an exemplary embodiment of the present invention. Referring to FIG. 4, the real estate transaction system includes a real estate securitization server 161, a management database 162, a real estate security transaction server 121, a transaction database 123, an asset evaluation server 171, a real estate price database 172, a trader terminal seller terminal 140, a resident terminal 181, and an investor terminal 191.

The real estate securitization server 161 may buy the real estate, divide an equity right for the real estate into a residence right and an investment security each having a different dividend right (real estate securitization), manage a right and a dividend for each security, exchange information on a change in the equity right with the real estate security transaction server 121, receive real estate selling information (when sale is requested for real estate securitization via real estate security transaction server 121), securitize the real estate, establish an equity right, and provide information on the equity right. The management database 162 stores real estate ownership (an ownership DB); information recorded on a real estate register, information recorded on a management book, and management condition information (a real estate DB); and information on quasi-real estate, such as objects other than real estate, that provides a real estate occupancy gain (a quasi-real estate DB). Of course, member information, and information on a commission, a cost, a tax, and the like related to the right change may also be managed by the database.

Here, the management condition may be established upon division of the real estate into the residence right and the investment security or later on, and may be modified later on. The management condition information includes a dividend ratio and a dividend ratio between the residence right yielding the right to use the property and the investment security, a condition of a buyer of the resident right, a selling condition of a buyer of the residence right, a dividend condition or date, etc. Some of these conditions may be designated by a seller for increasing a selling price.

For example, the equity right of the residence right may be set to 51%. The dividend ratio between the residence right and the investment security may be set 30:70. The buyer of the residence right may be set to a houseless person who is a first priority and supports two or more members of his or her family (according to a national policy). In the case of the condition of the selling time, the residence right is prohibited from being sold for seven years after acquisition of the residence right, and the equity right for investment is allowed to be divided and sold immediately after acquisition of the equity right. In this manner, the management condition may be determined according to a policy that reflects a type and price of real estate, a transition of a real estate policy, effects of the real estate on society, and the like. The management condition may adjust a level of activation and stability of a real estate market. Meanwhile, the management condition may be changed by entire equity sale, maximum equity sale, dividend distribution, an agreement among equity right holders, a change of a service policy, etc.

The real estate security transaction server 121 is connected to the real estate securitization server 161 and the asset evaluation server 171. The real estate security transaction server 121 provides information on the listed investment security (including the residence right, if necessary) and information on equity rights (including settings that affect the price, such as a residence right division ratio and a dividend ratio) requested for sale by the trader terminal (e.g., the resident terminal 181 or the investor terminal 182) together with a current price. Also, the real estate security transaction server 121 determines transaction allowable equity, a right to use the property, and a gain distribution ratio based on an equity right and buyer information according to the predetermined management condition upon a receipt of a buy request from the trader terminal (e.g., the resident terminal 181 or the investor terminal 182). Also, the real estate security transaction server 121 provides a change in the equity right caused by the transaction to the real estate securitization server 161. That is, the real estate security transaction server 121 performs transaction of the equity rights for the securitized real estate in lieu of the seller, and provides a function of enabling equity right holders to resell their equity rights (i.e., to circulate the equity rights).

In order to provide the above service, the real estate security transaction server 121 may include a transaction database 123 for storing contract information for equity sale, equity information, information on real estate recorded on a register, and management condition information (a real estate DB);

right establishment information including information recorded on a trust book; information on costs including a commission and a tax; transaction information for the equity sale; and dividend information. The transaction database 123 may further include a member information database for managing member information, a database for managing buying and selling request information, a buyer information database, and a seller information database.

Meanwhile, the configuration shown may be changed with a residence right transaction selling and buying scheme and a real estate buying scheme for transfer of a real estate ownership.

For example, when real estate sale is entirely entrusted to the real estate security transaction server 121, the seller terminal 140 is connected to the real estate securitization server 161 via the real estate security transaction server 121, thus eliminating a need for Connection ①. Meanwhile, if the seller terminal 140 is only via the real estate securitization server 161 for ownership transfer, Connection ② may be unnecessary.

Also, when the real estate security transaction server 121 sells the residence right in lieu of the buyer, or not, either Connection ③ or ④ may be necessary.

The real estate securitization server 161 divides the equity right for the real estate, lists the investment security, changes a right by selling the investment security, sells the residence right in a predetermined scheme, and transfers the right. For stable right transfer, the real estate securitization server 161 must acquire the ownership of the real estate. This, however, requires the real estate securitization server 161 to buy the real estate at a price requested by the real estate seller. Accordingly, the real estate securitization server 161 necessitates the capital for buying the real estate, and faces an increasing burden when the residence right or investment security sale is retarded or not accomplished.

In order to lessen the burden, in the exemplary embodiment, the real estate securitization server 161 securitizes real estate upon receipt of a sell request for real estate from the seller, transacts the investment security via the real estate security transaction server 121, and makes a contract with a buyer. A contract for the residence right is made in a separate way or via the real estate security transaction server 121. If the contract for the real estate reaches a predetermined level (e.g., 80% of entire price), the real estate securitization server 161 may loan money for buying the real estate from the financial server 169 on the security of the contract (⑤) and give the money to the seller terminal 140 to acquire an ownership for the real estate. The real estate securitization server 161 may then sell the investment security and the residence right according to the contract and safely provide the rights to respective buyers. If a management company of the real estate securitization server 161 has its money, it provides the money to the seller terminal 140 instead of loaning the money from the financial server 169. This enables the real estate securitization server 161 to lessen the burden on an ownership transfer time and the capital.

Of course, after all equity rights are contracted for sale, an ownership may be transferred, the rights may be established, and money may then be provided to the real estate seller. This, however, is a disadvantage for both the seller and the equity buyer when a time is elongated.

Figure 5:
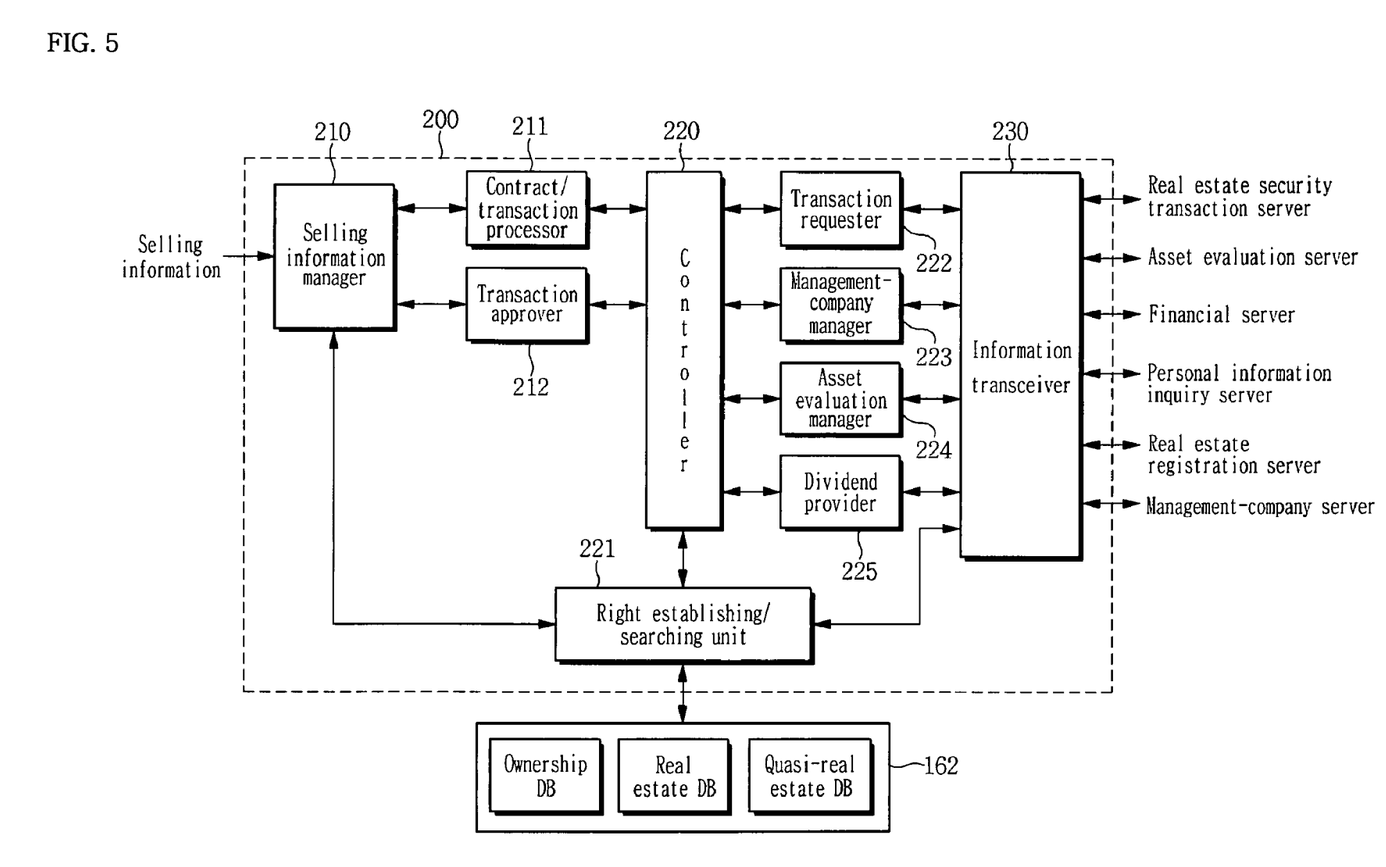
FIG. 5 is a block diagram illustrating a real estate securitization server according to an exemplary embodiment of the present invention.

FIG. 5 is a block diagram illustrating the real estate securitization server 200 according to an exemplary embodiment of the present invention. Referring to FIG. 5, the real estate securitization server 200 may selectively include a selling information manager 210 for receiving at least one of a selling price for real estate, a division ratio between a residence right and an investment security, and a dividend ratio between the residence right and the investment security, as selling information, as well as receiving a buy request for the real estate; a transaction requester 222 for providing the selling information from the selling information manager 210 to a real estate security transaction server to request a transaction contract; and a right establishing/searching unit 221 for receiving transaction completion information from the real estate security transaction server, paying a transaction money for the real estate, transferring a right, requesting the real estate security transaction server carry out the contracted transaction, and providing right information upon receipt of a right inquiry request.

Further, the real estate securitization server 200 may selectively include a transaction approver 212 for approving transaction by recognizing a sale likelihood or a validity for a sell request; a contract/transaction processor 211 for substantially processing a contract and a transaction; a management-company manager 223 for entrusting a residence right to a management company capable of providing offline real estate brokering, receiving sale information from the management company, and requesting to change a right; an asset evaluation manager 224 for obtaining asset value information for division of a residence right and an investment security in cooperation with an asset evaluation server; and a dividend provider 225 for managing a dividend date to provide a dividend.

Meanwhile, the real estate securitization server 200 may selectively include a controller 220 and an information transceiver 230 for transmitting and receiving information to and from foreign servers.

Figure 6:
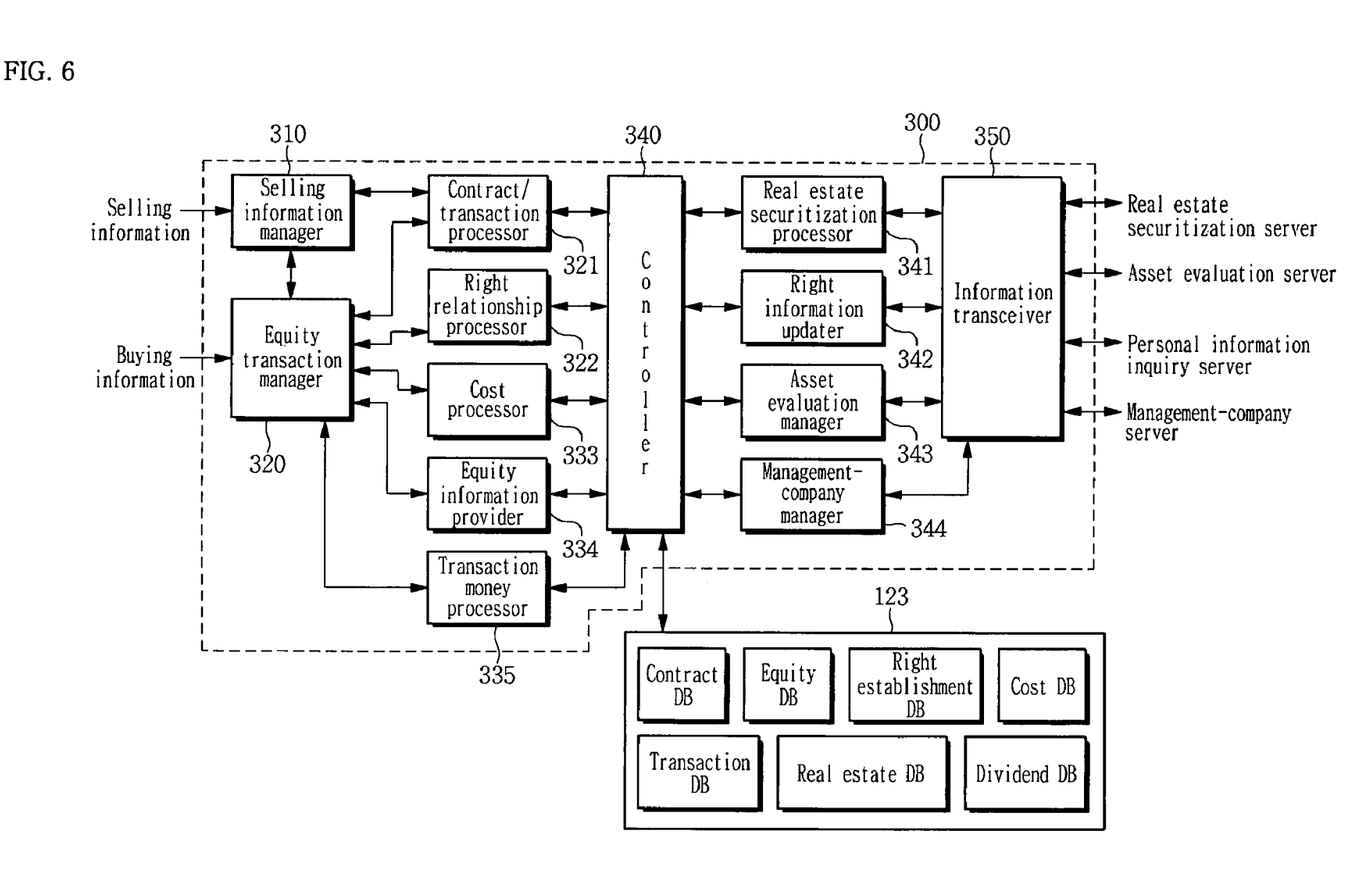
FIG. 6 is a block diagram illustrating a real estate security transaction server according to an exemplary embodiment of the present invention.

FIG. 6 is a block diagram illustrating a real estate security transaction server 300 according to an exemplary embodiment of the present invention. As shown in FIG. 6, the real estate security transaction server 300 cooperates with a real estate securitization server, an asset evaluation server, a management-company server, and a personal information inquiry server.

First, the real estate security transaction server 300 includes a selling information manager 310 for managing selling information of equity or real estate; an equity transaction manager 320 for providing equity sale information and receiving sell and buy requests; an equity information provider 334 for providing information on an equity right for real estate together with current price and a dividend ratio; a contract/transaction processor 321 for comparing buyer information with a management condition of the real estate to determine whether a buyer is allowed to buy the real estate upon receipt of a buy request and, when the buyer is allowed to buy the real estate, processing a contract or transaction; a right relationship processor 322 for producing information on a right relationship change to be provided to the buyer and the real estate securitization server based on the result from the contract/transaction processor 321; a transaction money processor 335 for paying the transaction money based on the result from the contract/transaction processor 321; and a cost processor 333 for separately calculating a tax and a commission in a cost and paying the cost.

The real estate security transaction server 300 further includes a real estate securitization processor 341 for requesting the real estate securitization server to sell real estate or receiving real estate equity information from the real estate securitization server; a Right information updater 342 for exchanging information on a change in the equity right with the real estate securitization server; an asset evaluation manager 343 for feeding back equity price information resulting from sale success to the asset evaluation server; a management-company manager 344 for providing information on a residence right for sale to a foreign management company that provides offline real estate brokering, receiving information on the sold residence right, and recognizing transaction occurrence; and an information transceiver 350 for connecting the components with the real estate securitization server, the asset evaluation server, the personal information inquiry server (required for determining whether the right condition is satisfied), and the management-company server.

The real estate security transaction server 300 may further include a controller 340 for connecting inputs and outputs of the components with each other while managing the components, providing information required for determination or computational functionality, searching and providing the necessary information from the transaction database 123 or updating the transaction database 123 with output information, and performing dividend-related processing.

Meanwhile, the Right information updater 342 may further include a right change notifier for notifying a holder holding the equity right of the real estate of a right change state, for example, via an e-mail, a short message, a voice message, or a multimedia message, when there is a change in the equity right. The right establishing/searching unit 221 shown in FIG. 5 may be replaced with the right change notifier.

The price information manager 343 provides equity sale information resulting from transaction success to the asset evaluation server, which may update existing asset evaluation information with the equity sale information.

The equity information provider 334 registers the equity right and selling price designated by the seller, and provides the information together with price information and dividend information. The contract/transaction processor 321 may perform the equity right sale using at least one of post-contract transaction, immediate transaction, and competitive bid.

When a time limit as the trust condition elapses or a target earning rate as the trust condition is accomplished, the controller 340 provides a dividend from capital gain. In this case, a dividend rate of the equity right yielding the right to use the property is smaller than that of the equity right for investment. Meanwhile, when the real estate is a house for residence, only a capital gain is provided as a dividend while when the real estate is a commercial building, an office building, or a parking lot capable of yielding a gain, a portion of the gain may be provided as a dividend according to a predetermined period of time. In this case, a greater dividend may be provided to a real estate user who contributes to earnings by using the real estate, unlike the dividend from the capital gain. Or, such dividend-related information may be provided to a dividend provider of the real estate securitization server so that the dividend is provided.

The system may further include a unit (not shown) for providing geographical information or price transition information for real estate.

Figure 7:
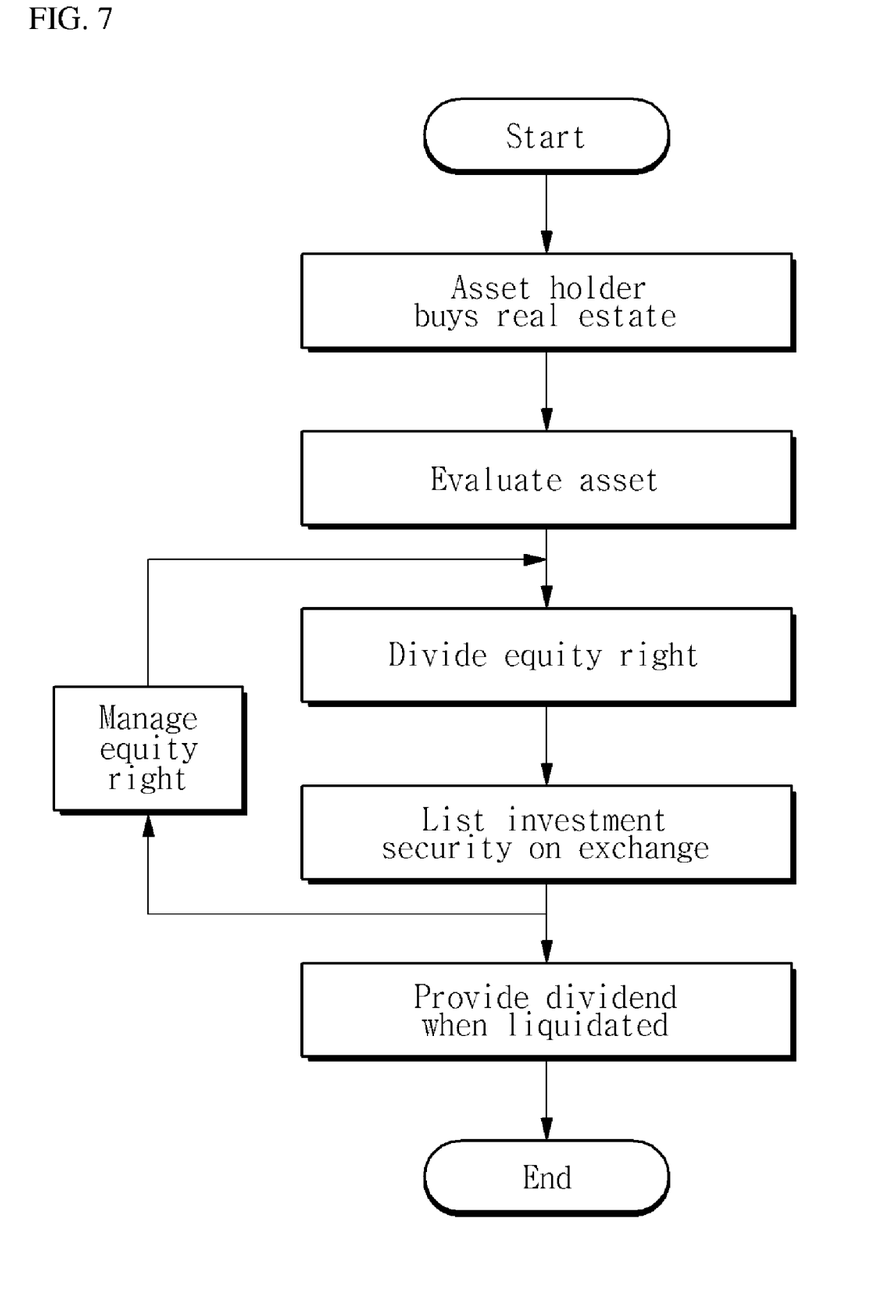
FIG. 7 is a flowchart illustrating a real estate transaction method using real estate securitization according to an exemplary embodiment of the present invention.

FIG. 7 is a flowchart illustrating a real estate transaction method according to the present invention.

The real estate transaction method using real estate securitization according to an exemplary embodiment of the present invention is a method for providing real estate transaction service between a seller and a buyer over a bidirectional data communicable network.

First, the seller accesses the real estate special purpose company server via the seller terminal and provides information on real estate for sale (e.g., an apartment, a house, an office building, or a commercial building) to the real estate special purpose company server. The information may be easily provided, for example, by using web documents on a web site. In this manner, the seller entrusts the real estate special purpose company server to sell the real estate.

The real estate special purpose company server and the sub-servers may provide a selling request form on the web for a real estate selling/trust procedure for a seller. The selling request form may include, for example, an indication of the real estate, a right type (i.e., a residence right and an investment right), sell/buy, personal information of a requester (e.g., an identification number, a name, an address, etc.), and an identity document (to be attached to the request). The request may further include an address of property, a type of the real estate (e.g., an office building, a commercial building, vacant land), and the like.

A ratio of the residence right and the investment security may be determined by the real estate special purpose company, based on a comment from the asset evaluation agency, or may be designated by an asset holder. In this case, since the asset holder may desire to hold a residence right or an investment right upon selling his or her real estate, investment right division, a dividend ratio for capital gain, and a proper selling price in addition to the ratio of the residence right holder and the investment right may be designated (these, when below the criteria, may be not approved by the transaction approver). The seller may request to sell the real estate by writing necessary information to a buying/selling request form and sending the request to the real estate securitization server. The server provides a request writing method and related explanation. Preferably, the server supports a consulting service via a web site, an E-mail, a mobile phone, a wired telephone, a bulletin board, and an off-line consulting room in order to provide detailed information on the use and function of the residence right and the investment right.

Figure 8:
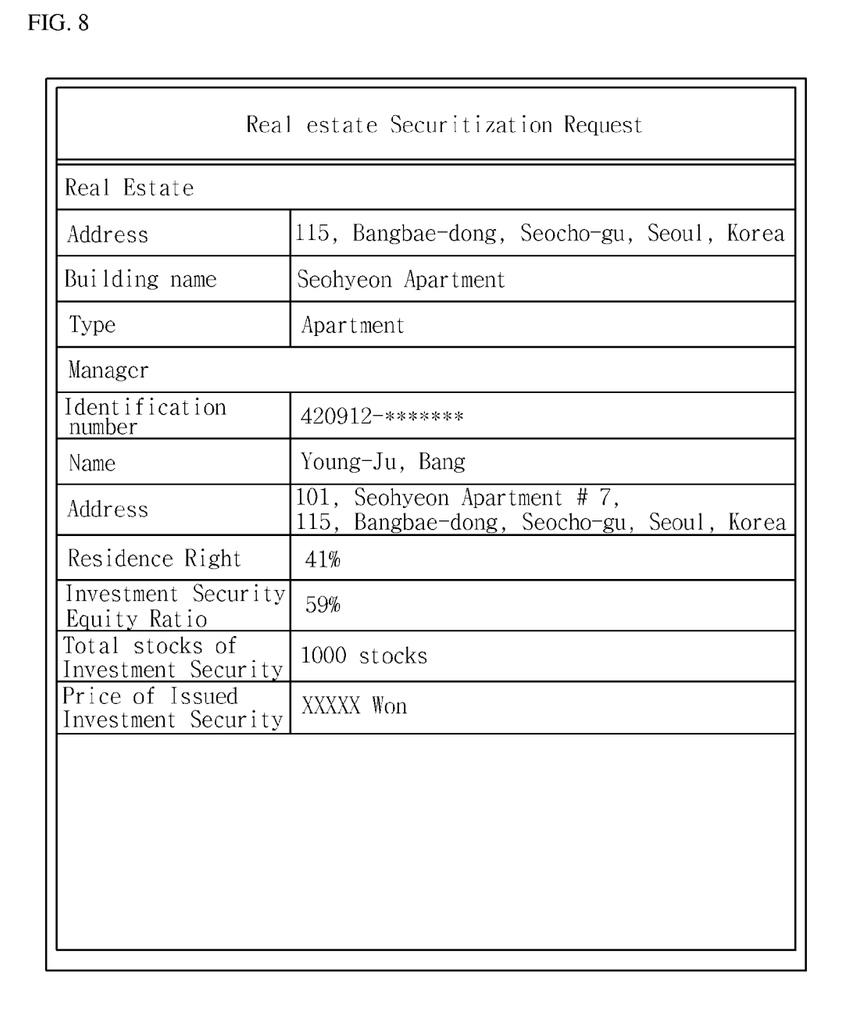
FIG. 8 illustrates a real estate securitization request.

FIG. 8 illustrates an example of such a real estate securitization request. This request is only a simple example and may be modified if necessary. The real estate securitization request includes an address of property and a type of a real estate in order to define the securitized real estate. The real estate securitization request may further include a name of a building, if possible, in order to facilitate the definition.

The real estate special purpose company or the separate real estate trust company is written as an owner for real estate securitization. Equity percentages and dividend percentages of the residence right holder and the investor may be found from the trust book (or a right book). The residence right holder and the investor may be identified by different colors. Also, the residence right holder and the investor may be identified by their securities. Actual securities are made with different colors for easy identification of a type of the right. The process allows an original rightful person to designate a third party as a residence right holder. The securitization request requires determining the equity percentages of the residence right and the investment security. And, the corresponding dividend percentages may also be determined and written separately. Total stocks of an issued investment security and a price of one stock of the investment security may be written. If these are not written, the information is determined by the real estate special purpose company according to a variety of criteria.

According to the present invention, the real estate special purpose company server may produce and store a trust register (not shown) on which the residence right, the investment right, and the change of circulated equity rights for the specific real estate are written, and may manage and update the trust register in cooperation with the real estate special purpose company server. Also, the real estate special purpose company server may allow the members to read a content of the trust register for free or at a cost. The trust registry provided by the real estate special purpose company server of the present invention may have a similar format with a real estate registry or a trust registry actually provided by the Korean Supreme Court.

The seller requests to sell specific real estate or entrusts the real estate, the value of which is then determined by the asset evaluation agency. A current value of the real estate must be determined exactly so that the real estate is not disregarded at a marketplace as an investment object when its equity right is divided and circulated. A right specification is referred to from a trust register or with a corresponding name. Preferably, the right registry includes details of the real estate.

Details of the residence right holder and the investor having investment security are preferably written to a separate real estate right book.

Thereafter, the real estate special purpose company provides information on a plurality of equity rights each containing at least a portion of the right related to the real estate, to the plurality of investor terminals, which may access the real estate special purpose company via the network, and sells the equity rights. Here, the equity right may indicate ownership equity of the specific real estate. For example, the smallest equity that can be sold may include 50%, 10%, 5%, and 1%. This equity may be divided into the residence right and the investment right, with a current price of the real estate being 100%. The equity rights may be provided as certificates to the buyers. Right transfer for each certificate may be managed by a transfer procedure. Meanwhile, investment security is a divided version of the investment right, i.e., the investment right is divided into a predetermined number of stocks and listed on the real estate security exchange.

The owner of the investment security has only a portion of the investment equity, i.e., a right to receive a predetermined dividend from the capital gain of the real estate at a specific time, instead of the right to directly occupy and use the property. Also, the owner of the investment security may buy and sell the securities at the exchange.

The residence right may be sold and bought in the variety of schemes described above (e.g., the scheme of selling and buying the residence right via an offline real estate broker, and the scheme of directly selling and buying the residence right to and from the real estate special purpose company). For example, the residence right may be sold via the real estate security exchange. In this case, the residence right may be regarded as one security and may not be divided for sale, unlike a typical investment security capable of being divided and combined freely.

Thereafter, if a predetermined dividend condition is satisfied that may be, for example, one of expiration of a predetermined time limit or a rise of a current price of the real estate in excess of a predetermined price, gains from the real estate are provided as dividends to the residence right holder and the investment right holder in a predetermined ratio. The dividend providing step may be performed by providing the revenue from the real estate as dividends to the residence right holder and the investment right holder when the real estate is unlisted and sold to a third party. In essence, the investment right holder sells his or her security at the exchange to obtain the gain. However, in a particular case where the real estate is liquidated, the gain may be provided as the dividend to each security owner.

Upon buying the real estate, the dividend percentages may be determined according to opinions of the real estate special purpose company, the asset evaluation agency, and the seller, and applied immediately when new real estate is sold. Also, percentages of the residence right and the investment right may be flexibly applied according to a government's real estate policy.

The method according to a preferred embodiment of the present invention includes a step of circulating the equity right including the residence right. That is, prior to providing the gain dividend, the investment right holder may list his or her equity right on the real estate security exchange for circulation. The residence right may also be circulated at the real estate security exchange. The step includes an equity right circulating step of selling, by the real estate security exchange server, the equity right to a plurality of investor terminals that can be connected via the network. The investment right may be transacted like stocks because it is divided into several securities for sale. A security seller suggests a selling price and a selling number of his or her stocks, and a buyer also a buying price and a buying number of the stocks. This transaction list is provided in real time and, when a buy order matches a selling order, the transaction is successfully made. Accordingly, a value of one stock of the investment security varies, in real time, with a price determined at the exchange.

Since the investor desires only to receive returns for investment, he or she can sell the equity right, instead of waiting to receive the dividend, to retrieve his or her money invested in the equity right. Also, the investor may divide and circulate the equity right by a desired amount according to the present invention. Accordingly, the investor can retrieve a desired amount of the investment within a desired period, thus increasing a degree of freedom of the real estate investment.

Figure 9:
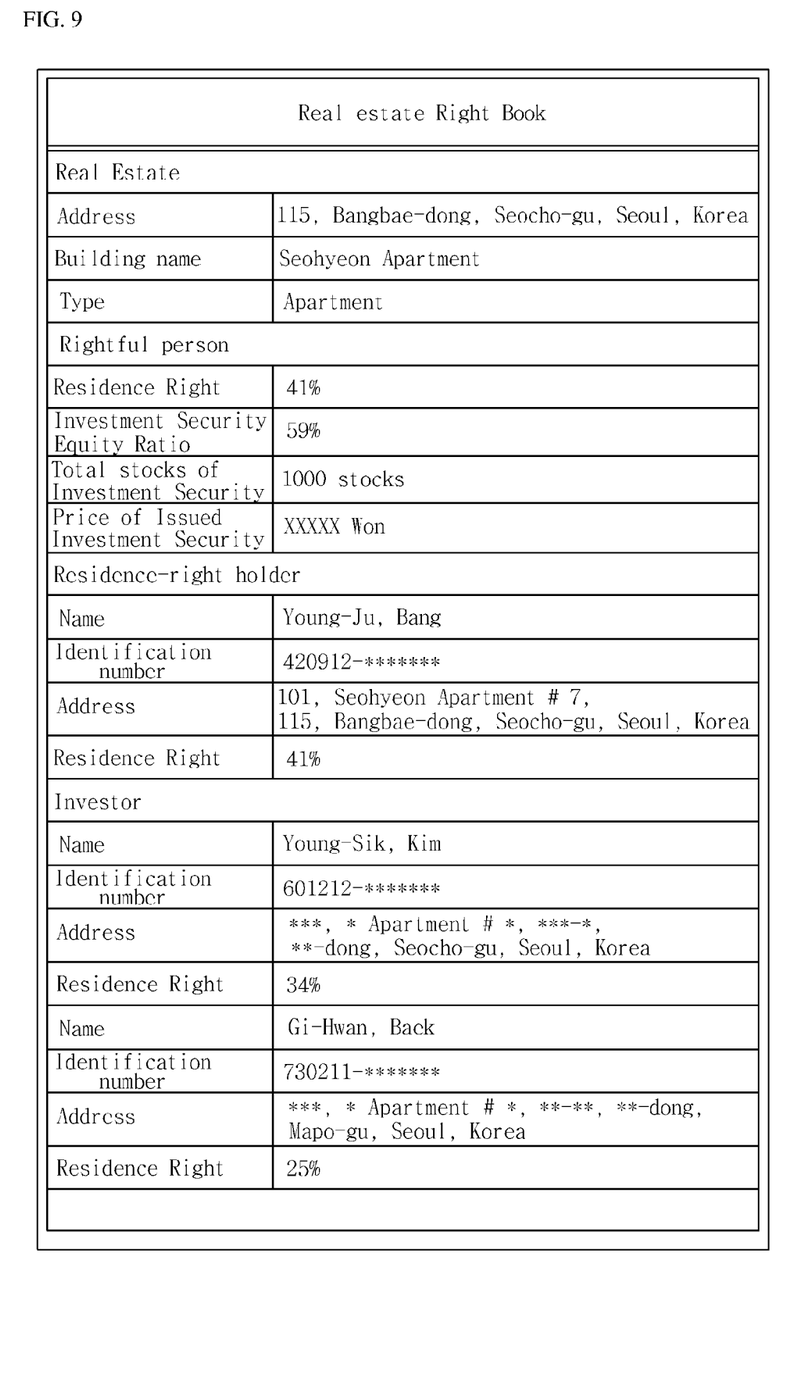
FIG. 9 illustrates a real estate right book.

FIG. 9 illustrates an example of a real estate right book according to the present invention. A residence right holder and investment-security owners for real estate are written to a separate real estate right book having details of the real estate recorded thereon.

For example, the real estate right book uses an address of real estate and a building name to define the real estate. The equity percentages of the residence right and the investment security for the real estate are written to the real estate right book, so that the equities of the security are identified.

Also, the residence right holder and the investors holding the investment security are written to a lower column of the real estate right book together with the equity percentages of the investment security.

As described above, according to the present invention, a person desiring to reside on the real estate can own the real estate by paying almost as little as half of its price and a person desiring only investment can invest a desired amount of money in the real estate during a desired investment period and easily retrieve his or her investment. This can promote investment in real estate, and allow real estate capital to be brought into the open and used for factories, thus creating a new real estate market. The present invention may be widely used in the field of real estate transaction.

According to the present invention, a real estate special purpose company buys real estate and divides a right for real estate into a residence right and an investment right that is transacted as an investment security at a real estate security exchange, like normal security, with the residence right and the investment right having different dividend percentages, such that a buyer desiring actual residence resides on the property by paying only a portion of the price of the real estate and a person desiring investment invests in real estate for desired equity.

Accordingly, the residence right buyer can acquire an ownership for real estate and execute a portion of his or her equity right to receive a set dividend by paying only a portion of the price of the real estate, unlike a lease contract. Also, money is not tied up in the real estate for a long time, and an investor can invest a smaller amount of money in specific real estate.

In particular, the residence right has a variety of percentages for satisfying a demand on only residence and a demand on both residence and dividend by enabling a person desiring actual residence to reside on the property by paying a small amount of money. That is, the present invention can satisfy all demands of a variety of investors.

Also, a server for providing a real estate securitization service divides an ownership of real estate for sale into a residence right and an investment right each having a different dividend percentage, makes a contract via a security transaction server to sell the rights, buys the real estate according to the contract, acquires an ownership, establishes the right, and sells a residence right and an investment right according to the contract, thus lessening a burden of buying the real estate on the real estate special purpose company and increasing reliability of right acquirement.

Furthermore, because the price of the investment security is formed at a security transaction market, unlike real estate the price of which just fluctuates, an investor is allowed to realize a gain trough investment security circulation even prior to dividend date. The price of the real estate reflects that of the security, resulting in true price of the real estate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A real estate transaction system for securitized real estate equity sale using trader terminals connected via a communication network, the system comprising:
   a real estate securitization server for buying real estate, dividing an equity right for the real estate into a residence right and an investment security each having a different dividend right, and managing a right and dividend for the security;
   a real estate security transaction server for providing information on the investment security from the real estate securitization server and information on investment security sale from the trader terminal, together with information on an evaluated price of the real estate, dividing and buying the investment security in response to a buy request from the trader terminal, and providing the resulting change in the right to the real estate securitization server; and
   an asset evaluation server for providing the information on an evaluated price for the real estate corresponding to the investment security to the real estate security transaction server, wherein:
   said residence right comprises a right an owner of said residence right to an owner-designated use of at least a portion of said real estate, wherein said dividend right of said residence right comprises a right to receive a dividend from the capital gain of the at least a portion of said real estate;
   said investment security comprises a trade instrument with a dividend rate set independently of the dividend rate of said residence right; and
   said residence right and said investment security comprise first and second independently transactable objects.

2. The system of claim 1, wherein
   the real estate securitization server further comprises a right establisher for dividing the equity right for the real estate into the residence right and the investment security, and
   the right establisher determines at least one of an equity right ratio between the residence right and the investment security, a dividend ratio between the residence right and the investment security, a buying condition for a residence right holder, a condition of a selling time, and a condition of a dividend date, based on a predetermined criterion.

3. The system of claim 2, wherein the real estate security transaction server provides information on the residence right and its dividend provided by the real estate securitization server or provided by a sell request from the trader terminal, provides predetermined buy restriction information for the residence right, buys the residence right in response to a buy request from the trader terminal, and provides the resulting change in the right to the real estate securitization server.

4. The system of claim 1, wherein the real estate securitization server comprises a right establisher for determining the residence right, the investment security, and a dividend right, based on value information for real estate to be bought via the asset evaluation server.

5. The system of claim 1, wherein the real estate securitization server comprises:
   a selling information manager for receiving at least one of a selling price for real estate to be bought, a division ratio between the residence right and the investment security, and a dividend ratio between the residence right and the investment security, as selling information, as well as receiving a buy request for the real estate;
   a transaction requester for providing the selling information from the selling information manager to the real estate security transaction server to request a transaction contract; and
   a right establisher for receiving transaction completion information from the real estate security transaction server, paying a selling price of the real estate, and transferring a right, requesting the real estate security transaction server to carry out the contracted transaction.

6. The system of claim 1, wherein the real estate security transaction server comprises:
   an equity information provider for providing information on the equity right for real estate together with a current price and a dividend ratio;
   an equity transaction manager for providing the information from the equity information provider to the trader terminal and receiving sell and buy requests;
   a transaction processor for comparing buyer information with a predetermined criterion to determine whether a buyer is allowed to buy the real estate upon receipt of the buy request received via the equity transaction manager and, when the buyer is allowed to buy the real estate, processing a contract or transaction;
   a right relationship processor for producing information on a right relationship change to be provided to the buyer and the real estate securitization server, based on the result from the transaction processor; and
   a selling price and cost processor for paying the transaction money and separately calculating a tax and a commission in a cost, based on the result from the transaction processor.

7. The system of claim 1, wherein the real estate security transaction server comprises:
   a real estate securitization processor for receiving a request for transaction of the residence right or the investment security from the real estate securitization server or requesting securitization of the real estate;
   a right information updater for exchanging information on a change in the equity right with the real estate securitization server; and
   an asset evaluation manager for feeding back price information and the dividend information of the residence right or the investment security to the asset evaluation server upon sale success.

8. The system of claim 7, wherein either the real estate security transaction server or the real estate securitization server comprises a management-company manager for providing information on a residence right for sale to a foreign management company for providing offline real estate brokering, and receiving information on a sold residence right to recognize transaction occurrence.

9. The system of claim 1, wherein the real estate security transaction server feeds back selling price information and dividend ratio information to the asset evaluation server upon sale success, and the asset evaluation server updates existing evaluation information with the fed back information.

10. The system of claim 1, wherein said residence right comprises a right to use the at least a portion of said real estate for at least one of residency by the owner, resale of said residence right, or obtaining lease revenue by leasing said at least a portion of said real estate.

11. The system of claim 1, wherein said residence right comprises a right of the residence right owner to sell the residence right at a price determined by the owner.

12. The system of claim 1, wherein said equity right comprises a right of the equity right owner to sell the equity right at a price determined by an equity market.

* * * * *